Dec. 11, 1934.   C. A. PERSONS   1,984,280
SPLASH GUARD ATTACHING DEVICE FOR VEHICLE FENDERS
Filed Feb. 27, 1932

Inventor.
Charles A. Persons
By Owen W. Kennedy
Attorney

Patented Dec. 11, 1934

1,984,280

UNITED STATES PATENT OFFICE 1,984,280

SPLASH GUARD ATTACHING DEVICE FOR VEHICLE FENDERS

Charles A. Persons, Worcester, Mass., assignor to Persons-Majestic Manufacturing Company, Worcester, Mass., a corporation of Massachusetts Application February 27, 1932, Serial No. 595,467

7 Claims. (Cl. 280—152)

The present invention relates to splash guards for attachment to the rear fenders of motor vehicles, in order to intercept tar, sand, or other road material thrown up by the wheels when the vehicle is in motion, and so prevent the accumulation of such matter on the rear portion of the vehicle.

The object of the invention is to provide an improved device for attaching splash guard members to vehicle fenders without the use of tools, or any manual operation, other than merely pressing the attaching device into clamping engagement with the edge of a vehicle fender. The device of the present invention is adapted to be applied to any type of motor vehicle fender, and so supports the associated guard member that the guard member will always hang approximately vertically from the fender, irrespective of the inclination of the rear portion of the fender from the vertical. In this latter respect the guard attaching device of the present invention differs radically from splash guards heretofore constructed, in which the attaching devices are rigidly attached thereto, so that each guard member tends to extend in the same plane as the rear portion of the fender.

The above and other advantageous features of the invention will hereinafter more fully appear from the following description taken in connection with the accompanying drawing, in which:—

Like reference characters refer to like parts in the different figures.

Figure 1:
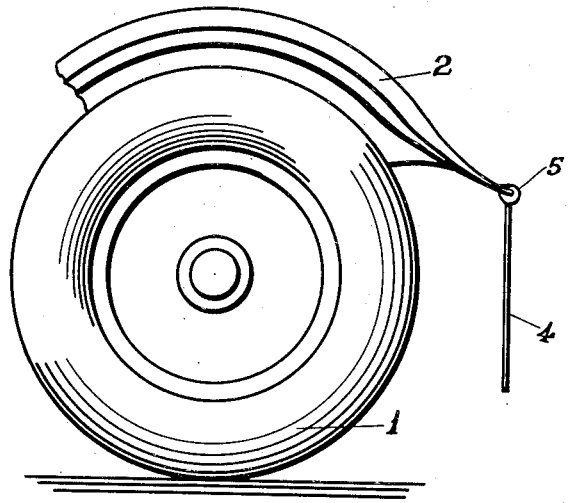
Fig. 1 is a view in side elevation of a motor vehicle wheel having an overhanging fender with a splash guard attached thereto, in accordance with the invention.
Figure 2:
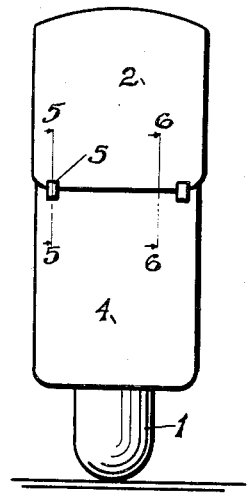
Fig. 2 is a view in rear elevation of the parts shown in Fig. 1.
Figure 6:
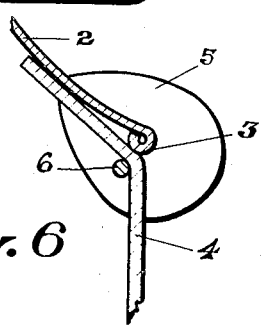
Fig. 6 is a vertical sectional view along the line 6—6 of Fig. 2, looking in the direction of the arrows.

Referring first to Fig. 1, the rear wheel 1 of a vehicle is shown as being overhung by a fender 2, the edge of which is turned or rolled to provide an enlargement, or bead 3, as best shown in Fig. 6. It is to be noted that the rear end portion of the fender 2 is disposed at an angle from the vertical, and the primary object of the present invention is to provide an improved device for attaching a flexible guard member, or flap 4, to the fender 2 in such a manner that the guard will always hang approximately vertically, irrespective of the angle which the fender makes with the vertical.

Figure 3:
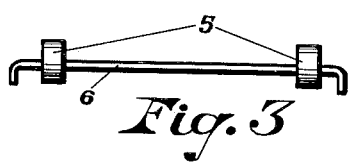
Fig. 3 is an assembly of the splash guard attaching device removed from the guard.
Figure 4:
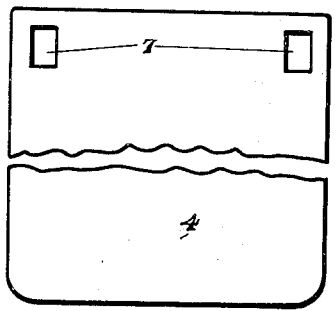
Fig. 4 shows the guard member removed from the attaching device.
Figure 5:
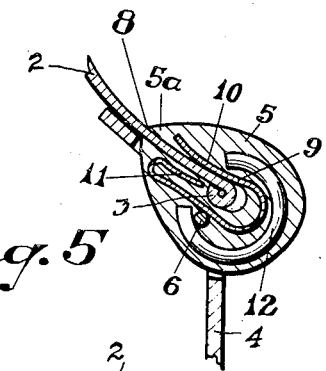
Fig. 5 is a vertical sectional view along the line 5—5 of Fig. 2, looking in the direction of the arrows.

As best shown in Fig. 3, the splash guard attaching device comprises one or more lugs 5 mounted on a supporting rod 6, the lugs 5 being so constructed as to be readily applied to the rear end portion of the fender 2, each lug 5 holding the fender bead 3 in clamping engagement in a manner to be hereinafter described. The splash guard member 4, preferably composed of durable flexible material such as rubber, fabric or leather, provides near its upper edge one or more openings 7 equal in number to the lugs 5 on the rod 6, each opening 7 being large enough to freely receive an attaching lug 5. In attaching the guard member 4 to the fender 2, the lugs 5 mounted on the rod 6 are passed through the openings 7 until the rod 6 comes into contact with the rear face of the guard member 4. Then, with a slot 8 in each lug 5, pointing upwardly as shown in Fig. 5, the lugs 5 are applied to the rear end of the fender 2 by passing the fender bead 3 through the slots 8 until the bead is held in clamping relation by the lug. When the lugs 5 have been so applied to the fender 2, the jaw portions 5a of each lug on opposite sides of the slot 8 extend substantially in the plane of the rear portion of the fender at whatever angle from the vertical the fender may have.

The flexible guard member 4, however, due to the fact that the attaching lugs 5 fit loosely in the openings 7, extends downwardly in a substantially vertical plane, as shown in Fig. 1, so as to be most effective in intercepting matter thrown by the wheel 1. It is also to be noted that the rod 6, carrying the attaching lugs 5, extends across the entire width of the guard member 4, in engagement with the rear surface thereof, so that the weight of the guard member 4 is borne entirely by the rod 6, which in turn transmits it to the lugs 5. Thus, there is no tendency for the attaching lugs to be torn loose from the guard member, due to flapping of the guard when carrying a considerable accumulation of mud or ice.

As best shown in Fig. 5, each attaching lug 5 is preferably formed of rubber, or similar resilient material, readily moldable, so as to embed therein a metallic clamp 9. The clamp 9 is preferably formed from metal strip, or wire, and is reversely bent so as to provide opposed jaw portions 10 and 11, with the end of the jaw 11 spaced from the jaw 10 a distance less than the average thickness of the edge bead 3 of the vehicle fender 2. The previously mentioned slot 8 in the lug 5 extends into the space between the clamping jaws 10 and 11, and in the operation of applying a lug 5 to the fender 2, the slot 8 is registered with the beaded edge of the fender. Then, by pushing on the lug 5, the bead 3 is forced between the yieldable jaws 10 and 11 until the end of the jaw 11 enters the corner between the bead and the body of the fender. By reason of the inherent resiliency of the clamp itself, the jaws 10 and 11 are maintained in tight gripping engagement with the fender 2, so that the lug cannot be accidentally removed from the fender.

Figure 7:
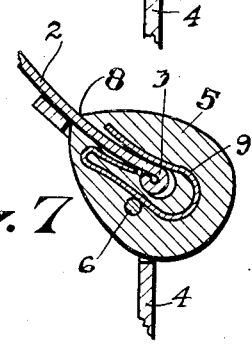
Fig. 7 is a vertical sectional view similar to Fig. 5, showing a modified form of guard attaching device.

The rod 6 which supports the weight of the guard member 4 extends through each lug 5 below the clamp 9, and preferably a metallic ring 12, with a portion thereof removed, is also embedded in the lug material so as to partially encircle both the closed end of the clamp 9, as well as the rod 6. The function of the ring 12, in each lug, is to take any strain on the rod 6, and transmit it to the opposed faces of the fender itself, rather than to the bead engaging clamp 9. In Fig. 7 the lug 5' is shown as being made without the reinforcing ring, in which construction the material of the lug itself takes the strain of the rod 6, without any strain being transmitted directly to the clamp 9 which might tend to disengage the same from the fender bead 3.

From the foregoing, it is apparent that by the present invention there is provided an improved device for attaching a splash guard to a vehicle fender in such a manner that the guard member itself will hang vertically, irrespective of the inclination of the fender. This particular way of attaching the guard member is of great advantage when used in connection with vehicle fenders that are formed with a streamline effect, so that the rear portion of the fender is almost horizontal. Obviously, a splash guard member with rigid attaching devices would tend to assume a horizontal position when applied to such a stream-line fender, whereas the separate attachment of the lugs to the fender in the present arrangement eliminates this possibility. Furthermore, in molding guard members from rubber, the incorporation of attaching devices as integral parts of the guard, as heretofore proposed, greatly complicates the molding process, whereas separate molding of the guard members and attaching lugs can be carried out according to the present invention with extremely simple molds, at a high rate of production.

I claim,

1. A device for attaching a splash guard to a vehicle fender, comprising a lug having a fender engaging clamp embedded therein and a splash guard supporting member extending through said lug on opposite sides of said clamp.

2. A device for attaching a splash guard to a vehicle fender, comprising a lug and a resilient fender engaging clamp embedded therein, a rod extending through said lug at right angles to said clamp and a reinforcing member encircling said rod also embedded in said lug.

3. A device for attaching a splash guard to a vehicle fender, comprising a lug of moldable material having a fender engaging clamp embedded therein, a splash guard supporting rod extending through said lug, and a reinforcing member also embedded in the lug material for supporting said rod.

4. A device for attaching a splash guard to a vehicle fender, comprising a lug of moldable material having a fender engaging clamp embedded therein, a splash guard supporting rod extending through said lug at right angles to said clamp and a reinforcing ring encircling said rod for supporting the same.

5. Means for attaching a splash guard to a vehicle fender, comprising in combination, a flat guard member having an opening in the face thereof, near one end, a clamp insertable bodily through the opening in said guard member for forcibly engaging the edge of said fender, and a member carried by said clamp and extending on opposite sides thereof for holding said guard member on the fender.

6. Means for attaching a splash guard to a vehicle fender, comprising in combination, a flat guard member having an opening in the face thereof, near one end, a clamp insertable bodily through the opening in said guard member for forcibly engaging the edge of said fender, and a rod extending through said clamp on opposite sides thereof for engaging the rear surface of said guard member and holding it in position on the fender.

7. Means for attaching a splash guard to a vehicle fender, comprising in combination, a flat guard member having a pair of spaced openings in the face thereof, near one end, a rod and a pair of clamps adjustably mounted on said rod so as to correspond to the spacing between said openings, the insertion of said clamps bodily through said openings to forcibly engage the edge of the fender serving to engage said rod with said guard member to hold the latter in position on the fender.

CHARLES A. PERSONS.